United States Patent

[11] 3,619,338

[72] Inventors Lucius G. Gilman
Wakefield;
Morton H. Gollis, Brookline, both of Mass.
[21] Appl. No. 733,190
[22] Filed May 14, 1968
[45] Patented Nov. 9, 1971
[73] Assignee Monsanto Research Corporation
Saint Louis, Mo.
Continuation of application Ser. No. 234,513, Oct. 31, 1962, now abandoned, which is a continuation-in-part of application Ser. No. 845,593, Oct. 12, 1959, now abandoned.
The portion of the term of the patent subsequent to Sept. 14, 1982, has been disclaimed.

[54] GLASS FABRIC SHEETS BONDED TOGETHER WITH POLYISOCYANURATES PREPARED FROM AN ORGANIC DIISOCYANATE AND A MONOISOCYANATE USING IONIC POLYMERIZATION CATALYSTS
2 Claims, No Drawings

[52] U.S. Cl..................................................... 161/93,
117/126, 156/331, 161/170, 161/192, 161/213, 161/270, 260/77.5, 260/248
[51] Int. Cl....................................................... B32b 17/10
[50] Field of Search............................................. 161/93, 170, 190, 192, DIG. 4, 203; 260/77.5, 248; 117/126 GR; 156/331

[56] References Cited
UNITED STATES PATENTS

| | | | |
|---|---|---|---|
| 2,952,576 | 9/1960 | Wheelock et al. | 161/193 X |
| 2,977,360 | 3/1961 | Dixon | 260/77.5 X |
| 2,978,449 | 4/1961 | France et al. | 260/248 |
| 3,044,913 | 7/1962 | Lundberg | 161/190 |
| 3,206,352 | 9/1965 | Gollis et al. | 161/192 X |
| 3,211,703 | 10/1965 | Gilman et al. | 161/192 X |
| 3,211,704 | 10/1965 | Gilman et al. | 260/77.5 |
| 3,367,934 | 2/1968 | Tate et al. | 260/248 |

*Primary Examiner*—John T. Goolkasian
*Assistant Examiner*—D. J. Fritsch
*Attorneys*—Lorna A. Ferris, Robert M. Dickey and Mary B. Moshier

ABSTRACT: Polyisocyanurates made by reacting diisocyanates and monoisocyanates, process for making the polyisocyanurates using ionic polymerization catalysts, and laminates made fusing the polyisocyanurates as laminating resins.

GLASS FABRIC SHEETS BONDED TOGETHER WITH POLYISOCYANURATES PREPARED FROM AN ORGANIC DIISOCYANATE AND A MONOISOCYANATE USING IONIC POLYMERIZATION CATALYSTS

CROSS-REFERENCE TO RELATED APPLICATIONS

This application is a continuation of Ser. No. 234,513, filed Oct. 31, 1962 now abandoned, which in turn is a continuation-in-part of application Ser. No. 845,593, filed Oct. 12, 1959, now abandoned This invention relates to a novel polyisocyanurate adhesive composition, which possesses exceptional characteristics for use as a laminating resin, especially for bonding together glass fabric webs.

Under suitable reaction conditions a diisocyanate was made to polymerize into a solid product. The conditions of reaction involve temperatures of up to about 125° C. and the use of an ionic polymerization catalyst. Through extensive investigation we have found that the diisocyanates as a class can be modified with a monoisocyanate to yield polymeric products having enhanced toughness and stability at elevated temperatures. The modified polyisocyanurates of the present invention are especially useful as laminating resins.

Accordingly an object of this invention is to provide a novel polyisocyanurate having toughness and exceptional utility at high temperatures.

Still another object of this invention is to provide a method of producing polyisocyanurates having toughness and exceptional utility at high temperatures.

A further object of this invention is to provide a laminate of glass fabric having exceptional properties for use as a structural material for rocket motors.

Other objects and advantages of this invention will become apparent from the following description and explanation thereof.

In accordance with the present invention the polyisocyanurate is obtained by reacting a diisocyanate and a monoisocyanate in the presence of an ionic polymerization catalyst.

By an isocyanurate is meant an isocyanate trimer. Trimerization of an isocyanate to an isocyanurate is illustrated by the equation

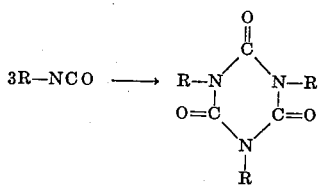

where R is the residue of the isocyanate.

The trimerization of an isocyanate to an isocyanurate ring is sometimes referred to as a polymerization. The trimeric product is a polymer of an isocyanate, in the sense that the repeating unit is the original isocyanate unit. The polymers to which this invention relates, by way of distinction, are polymers of isocyanurates, in which the repeating unit is the isocyanurate ring unit.

A substantial number of such isocyanurate rings as the repetitive units, such as 25 or more, joined in a single molecule by intervening difunctional radicals, form the materials herein designated as tough polymeric products or resins.

We have discovered that a diisocyanate alone can be polymerized to produce a polyisocyanurate having the following repeating structural unit:

I

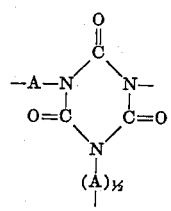

wherein A is a divalent organic radical. It will be noted that the above structural unit is trifunctional, and thus will produce a cross-linked polymer. That cross-linked polymers are produced is borne out by the fact that the polymeric material is infusible and insoluble in either organic or inorganic solvents. The monoisocyanate serves to reduce cross-linking by reacting with one of the radicals of the cyclic structure and thus promote linear polymerization thereof. The product obtained by reacting the diisocyanate with the monoisocyanate has improved toughness and high temperature stability over that produced from the diisocyanate alone.

The polymer prepared in accordance with the present invention contains the following structural unit:

II

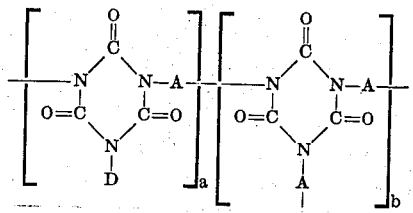

wherein A is a divalent organic radical and is the same as A of formula III below and D, a monovalent radical, is the same as D of formula IV below, $a$ is an integer of usually at least about 25 and may be as high as 400 or higher when $b$ is zero, and $b$ on the other hand may be zero or an integer ranging up to 10 or more times the value of $a$, or more usually about 0.1 to 10 times the amount of $a$.

The polymeric product of this invention is prepared from any type of diisocyanate, particularly those having the following structural formula:

III.    OCN—A—NCO wherein A is a divalent organic group preferably of the hydrocarbon type, and may include, for example, an aliphatic group such as a divalent cycloaliphatic group, e.g., cycloalkylene, cycloalkenylene, etc.; an ether group such as —R—Y—R— wherein R is an alkylene group and Y is oxygen or sulfur; an amine group such as $$-R''-\underset{R'}{N}-R''-$$

wherein R' is an alkyl group and R" is an alkylene group; an amide group such as $$-R''-N-R''-$$
$$R'-C=O$$

wherein R' is an alkyl group and R" is an alkylene group; a silane group such as $$-R''-\underset{R'}{\overset{R'}{Si}}-R''$$

wherein R' is an alkyl group and R" is an alkylene group; a siloxy group such as $$-R''O-\underset{OR'}{\overset{OR'}{Si}}-OR''-$$

wherein R' is an alkyl group and R'' is an alkylene group; a substituted alkylene group such as $$-\underset{\underset{X}{|}}{R''}-$$

wherein X is halogen, tertiary amino, cyano, N-disubstituted sulfonamide, alkoxy, etc. and R'' is an alkylene group; an aryl group such as phenyl, naphthyl, etc.; a substituted arylene group in which the substituents are halogen, nitro, nitroso, cyano, alkyl, alkenyl, alkynyl, etc.; or a diarylene group which can be represented by the following formula:

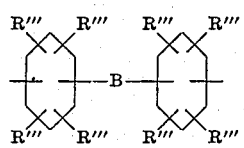

wherein R''' may be hydrogen alkyl, nitro, nitroso, halogen, cyano, etc., and not more than two of the R''' groups for each phenylene group may be other than hydrogen and B may be alkylene, alkenylene, alkynylene, sulfur, oxygen, sulfone, silyl, —CH$_2$—Z—CH$_2$— wherein Z may be a divalent cyclic group, for example, of the hydrocarbon type including the alicyclic or arylene, etc. Specific examples of such monomeric materials are 1,6-hexane diisocyanate; 1,4-butane diisocyanate; 1,4-diisocyanato-2-butene; ββ'-diisocyanatodiethylsulfide; ω,ω'-diisocyanato dipropylether; 1,5-didsocyanato-2,2-dimethylpentane; 1,6-diisocyanato-3-methoxyhexane; 1,4-bis(3-isocyanatopropoxy)butane; 1,4-bis(isocyanatoethyl)cyclohexane; 4,4'-dicyclohexylmethanediisocyanate; 2,2-bis(4-isocyanatocyclohexyl)propane; bis(4-isocyanato)2-methylcyclohexyl methane; 4,4'-diisocyanatodiphenyl disulfide; 4,4'-azobenzene diisocyanate; 4-isocyanatophenyl ester of 4-isocyanatophenylsulfonic acid; 4,4'-benzophenone diisocyanate; 4,4'-diisocyanatodiphenylether; 1,2-bis(4-isocyanatophenoxy)ethane; 1,2-bis(4-isocyanatobenzenesulfonamido)ethane; 4,4'-stilbene diisocyanate; 2,2-bis(4-isocyanatophenyl)propane; 4,4'-diisocyanatodiphenylsulfone; β,β'-bis(4-isocyanatophenoxy)diethylether; cyclohexyl-bis(4-isocyanatophenyl)methane; 4-nitrophenyl bis(4-isocyanatophenyl) methane; 2,2'-dimethyl-4,4'-diisocyanatodiphenyldisulfide; α,α'-diisocyanato-p-xylene; 1,4-bis(2-isocyanatoethyl)benzene; 4,4'-bis(3-isocyanatopropyl)biphenyl; 4-isocyanatobenzylisocyanate; 1-(p-isocyanatophenyl)-3-isocyanatobutane; 4-isocyanatocyclohexy)(4-isocyanatophenyl)methane, etc.

The polymerization of the diisocyanate is conducted in the presence of a monoisocyanate and for the purpose of our invention any monoisocyanate may be useful for the purpose of modifying the polymeric product. The monoisocyanates which are particularly useful may be represented by the following structural formula:

IV.   D—NCO wherein D is a monovalent aliphatic group such as cycloaliphatic, e.g., cycloalkyl, cycloalkene, etc.; alkyl; aryl; alkaryl; aralkyl; mono- or poly-nuclear aromatic or heterocyclic groups such as pyridyl, etc.; R'—Y—R''— wherein R' is an alkyl group and R'' is an alkylene group; an amine group such as

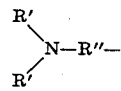

wherein R' is an alkyl group and R'' is an alkylene group; an amide group such as

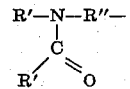

wherein R' is an alkyl group and R'' is an alkylene group; a silane group such as

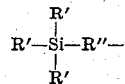

wherein R' is an alkyl group and R'' is an alkylene group;

wherein X' is halogen, tertiary amino, cyano, N-disubstituted sulfonamide alkoxy, etc. and R' is an alkyl group; a substituted aryl group such as

wherein X'' is halogen, alkyl, nitro, nitroso, cyano, etc., and Ar is phenyl, naphthyl or —Ar'—Z—Ar'— wherein Z is oxygen, sulfur, sulfone, silyl, alkyl, alkenyl, alkynyl, etc. and Ar' is a phenylene, naphthylene or —CH$_2$—M—CH$_2$— wherein M is a divalent cyclic hydrocarbon group such as alicyclic, arylene, etc. Specific examples of monoisocyanates are phenyl isocyanate; para-tolyl isocyanates; benzyl isocyanate; phenylethyl isocyanate; 4-cyclohexylphenyl isocyanate; 4-nitrophenyl isocyanate; 4-chlorophenyl isocyanate; 3-cyanophenyl isocyanate; 4-methoxyphenyl isocyanate; 4-ethoxyphenyl isocyanate; 4-isocyanatoazobenzene; ethyl isocyanate; allyl isocyanate; normal butyl isocyanate; dodecyl isocyanate; cyclohexyl isocyanate; isobutyl isocyanate; secondary butyl isocyanate; α-isocyanatoethylbenzene; 1-chloroethyl-2-isocyanate; 1-chlorohexyl-6-isocyanate; 1-cyanopropyl-3-isocyanate; γ-isocyanatopropoxycyclohexane; etc. The monoisocyanate may be present in any amount relative to the diisocyanate, however, for our purpose about 40 mole percent of monoisocyanate based on diisocyanate are particularly useful.

It has been shown that for best results, a balance is needed between the cross-linking (diisocyanate) and linear (monoisocyanate) units so that complete reaction of all isocyanate groups can be effected and still produce a resin that is infusible. Theoretical studies have shown that the distribution of products formed in the trimerization of mixed isocyanates can be controlled by adjusting the relative reaction rates and stoichiometric ratios of the individual isocyanates, and thus desirable ratios of diisocyanate to monoisocyanate in preparing the present resins will advantageously be chosen with reference to the reactivity ratio of the comonomer pair.

The polymerization reaction is catalyzed by means of a catalyst which induces ionic polymerization and may include a strong base of an organic or inorganic type as long as it does not affect adversely to any significant extent the desired product materials. The strong bases include, for example tertiary amines. alkyl tertiary amines, aromatic tertiary amines or heterocyclic tertiary amines, e.g., triethylamine, pyridine, 1,4-diazabicyclo[2.2.2]octane, etc.; alkali or alkaline earth metal salts of low molecular weight carboxylic acids such as those containing about one to three carbon atoms, e.g., sodium carbonate, sodium acetate, potassium acetate, etc.; alkali metal alkoxides, e.g., sodium methoxide, potassium propoxide, etc.; organic tertiary phosphines, e.g., triethylphosphine, dimethylphenyl phosphine, etc.

From the compounds enumerated above it will be readily apparent to those skilled in the art that the catalyst is one which induces ionic polymerization and is designated for the purpose of this specification as an ionic polymerization catalyst in the generic sense. The quantity of catalyst employed for the reaction may vary over wide limits, but in general about 0.1 to 50 mole percent, preferably about 0.1 to 5 mole percent of a strong base catalyst, such as the bicyclo compounds, or preferably about 20 to 50 mole percent of a weaker base catalyst such as triethylamine, based on monomer starting material may be employed.

The catalysis of the polymerization reaction may be enhanced by the additional use of an organic epoxide. The organic epoxide is miscible and/or soluble with the diisocyanate monomer. The epoxide includes aromatic and aliphatic compounds such as, for example, epihalohydrins, e.g., epichlorohydrin, etc.; alkylene oxides, e.g.; propylene oxide, styrene oxide, etc.; alkenyl oxide, e.g., butadiene mono- or dioxide, etc.; glycidyl esters, e.g., ethyl glycidate, etc. Generally the presence of the epoxy group enhances catalysis, and the compound thereof is wholly or partly miscible or soluble with the monomer. The amount of organic epoxide employed with the ionic polymerization catalyst may vary considerably, but in general up to 100 mole percent, preferably about 0.1 to 10 mole percent of organic epoxide when using a strong base catalyst such as the bicyclo compounds, or preferably about 20 to 50 mole percent of organic epoxide when using a weaker base catalyst such as triethylamine, may be used.

The polymerization reaction is conducted in liquid phase by either employing a temperature at which the materials are in that state, involving the same in bulk form or by the use of a suitable solvent. By either method the polymerization temperature may vary from about ambient level to about 125° C. with the upper limit being determined by the fact that adverse effects tend to become noticeable above the same. However, in some instances temperatures above 125° C. may be used. After the polymerization at up to 125° C., the resin can be heated to more elevated temperatures, into the range of 300°–400° C., to drive off solvent and effect postcure. While the temperature of reaction may vary with pressure, nevertheless it is contemplated employing atmosphere pressure for the temperature range given above. On the other hand, if desired, the reaction may be conducted at subatmospheric or superatmospheric pressure and in this case the temperature may be varied outside the range herein given. When the reactants are employed in bulk form, that is, without a solvent it is preferred to conduct the polymerization at a temperature of about ambient level to 75° C. in contrast to a preferred temperature of about 50° to 125° C. when using a solvent. Using less solvent than monomer (on a weight basis), it has been found advantageous to use a temperature of about 50° C. until gelation, and subsequently raise the temperature to about 125° C. before discontinuing heating. The time required for the polymerization reaction to be substantially completed may vary considerably depending upon the type of monomer employed and whether or not a solvent is used. When the reaction is effected in bulk form it may take up to about 5 minutes for substantial completion and be considerably longer when a solvent is used in the reaction. With a solvent, the reaction may take up to about 2 hours for substantial completion. The time of reaction is only important as far as the quantity of polymer is concerned. If desired, the reaction time may be shortened to suit the particular needs of a situation or for that matter lengthened, without departing from the scope of the present invention.

Reaction conditions conducive to the desired stability of the product resin include purity of reaction mixture components, especially the isocyanate reactants, and essentially anhydrous conditions until substantially all the isocyanate groups have reacted.

The solvent employed for the polymerization reaction can be any one or more of those commonly employed for the same purpose. To be effective the solvent is one in which the monomer and lower molecular weight reaction products are miscible or soluble. Specific examples of solvents which are useful for the present invention are dimethylformamide, dimethylsulfoxide, 1,2-dichloroethane, trichloroethylene, etc.

The solvent is used in amounts to provide a medium in which at least the monomer can be dissolved or as a diluent to slow down the reaction, and therefore, it can vary over wide limits for the purpose of the present invention. Generally about 0.1 to 20 parts by weight of solvent per part of monomer starting material are employed. Such quantities of solvent are merely illustrative of the range which can be used for the present invention.

As previously indicated the monoisocyanate modifies the polymer obtained from the polymerization of diisocyanate to yield a material having enhanced toughness and stability and at elevated temperatures over the product prepared solely from a diisocyanate. The modified polymers are especially useful as laminating resins for sheets of glass fabric or as a reinforcement material for glass filament which is wound spirally into a cylindrical shape. The laminated sheets of glass fabric have especial use as radomes for aircraft. Some advantages of the present invention reside in the facts that the diisocyanate starting material is sufficiently low in viscosity to permit easy application to sheets of glass fabric and the polymerization reaction during lamination can proceed at atmospheric pressure. Fortunately the diisocyanate wets the glass fabric, which result of itself is unusual because it eliminates a serious difficulty which is common among other types of laminating materials. After the sheets of glass fabric have been coated with the diisocyanate and monoisocyanate containing the ionic polymerization catalyst, the coated sheets are placed in face-to-face contact and permitted to remain in this position until sufficient resin has been produced to bind the same. As additional uses for these polymers there may be listed adhesives for joining surfaces such as metal to metal, wood to wood, paper to paper, or dissimilar materials; potting compositions for use in the construction of magnet coils or electronic assemblies; or wire insulation.

In order to provide a fuller understanding of the present invention reference will be had to specific examples which form a part of this specification.

EXAMPLE 1

1.2 parts by weight of styrene oxide and 1 part by weight of triethylamine were added in turn to a solution consisting of 5 parts by weight of 4,4'-diphenylmethane diisocyanate and 1.8 parts by weight of phenyl isocyanate and 50 parts by weight of N,N-dimethylformamide at a temperature of about 75° C. The resultant reaction mixture, while protected from atmospheric moisture, was stirred at a temperature of 75° C. for a period of 4.5 hours. At the end of this period, gelation of the reaction mass occurred, indicating that cross-linking of the polymer molecules took place to a substantial extent. The resultant gel was powdered, and then washed with ethyl ether in a Waring Blender or mixer to yield 7.4 parts by weight of a light tan color solid product. The resultant solid polymeric product had improved toughness and formability characteristics over the product made solely from the same diisocyanate. Additionally, the product was substantially better from the standpoint of thermal stability.

EXAMPLE 2

The same procedure as employed in example 1 was used in this experiment, except that 2.1 parts by weight of phenyl isocyanate were employed, and the reaction was carried out at 100°–110° C. The reaction was carried out for a period of 4 hours, and thereafter, the reaction mass was diluted with ethyl ether and a pasty product separated therefrom. The pasty product was powdered in a Waring Blender to yield 7.6 parts by weight of solid product. In the above experiment, it was significant to note that no gelation occurred, indicating that a substantial amount of linearity was present in the molecules of the polymeric product.

EXAMPLE 3

5.6 parts by weight of styrene oxide and 1 part by weight of 1,4-diazobicyclo[2.2.2]octane were added in turn to a solution consisting of 45 parts by weight of 4,4'-diphenylmethane diisocyanate and 15.6 parts by weight of phenyl isocyanate in 360 parts by weight of N,N-dimethylformamide at ambient temperature. The resultant reaction mass was permitted to stand at ambient temperature for 1.5 hours, whereupon gelation occurred. From this experiment it is to be noted that the particular catalytic material was instrumental in effecting gelation in a shorter period of time than in the above experiments, and also, gelation occurred at a lower temperature.

EXAMPLE 4

The same procedure as employed in example 3, except that the reaction was conducted at a temperature of about 75° C. As a result, gelation of the reaction mass occurred within one-half hour rather than the 1½ hours it took in the case of example 3.

EXAMPLE 5

1.8 parts by weight of phenyl isocyanate, 1.2 parts by weight of styrene oxide and 1 part by weight of triethylamine were added in turn to 5 parts by weight of molten 4,4'-diphenylmethane diisocyanate. Within a period of 10 minutes, the reaction mass set up into a yellow, tough solid. The reaction also took place with an exothermic effect.

EXAMPLE 6

One part by weight of N,N'-dimethylformamide, 2.4 parts by weight of phenyl isocyanate, 1.6 parts by weight of styrene oxide and 1.4 parts by weight of triethylamine were added in turn to 6.7 parts by weight of molten 4,4'-diphenylmethane diisocyanate. Within a period of 30 minutes the reaction mass set up into a yellow, tough solid, with an exothermic effect.

To illustrate how the above polymers of this invention can be used as laminates, the following examples are given.

EXAMPLE 7

1.8 parts by weight of phenyl isocyanate, 1.2 parts by weight of styrene oxide, and 1 part by weight of triethylamine were added in turn to 5 parts by weight of molten 4,4'-diphenylmethane diisocyanate. The hot reaction mixture was quickly poured over six layers of style 181 glass fabric contained in a 4-inch circular mold, which was set in a hydraulic molding press and preheated to about 75° C. The circular mold disk was set in place and a mold pressure of 170 p.s.i. was applied for about 30 minutes. The resulting laminate, approximately one-sixteenth inch thick, was pale yellow and translucent. A freshly cut cross section indicated excellent penetration of polymer and excellent adhesion. A sample of the laminate was exposed at a temperature of 371° C. (700° F.) in an inert atmosphere. The loss in weight observed over a period of 1½ hours was 11 percent. At the end of this period no further weight loss was observed.

EXAMPLE 8

One part by weight of N,N-dimethylformamide, 2.9 parts by weight of phenyl isocyanate, 2 parts by weight of styrene oxide, and 1.6 parts by weight of triethylamine were in turn added to 8 parts by weight of molten 4,4'-diphenylemethane diisocyanate. In the meantime, a rectangular Teflon spacer, one-eighth inch thick, had been placed in a hydraulic molding press preheated to about 75° C. Two layers of 10-inch square, style 181 glass fabric, were placed within the spacer and a portion of the hot reaction mixture poured over the layers of fabric. The fabric appeared to wet readily. This process was repeated using two pieces of glass fabric at a time, until a total of 10 layers of fabric were stacked within the spacer. The remainder of the hot mixture was poured over the stack of glass fabric, and a mold pressure of 60 p.s.i. was applied thereto. The sample was kept in the mold at 75° C. and 60 p.s.i. for 30 minutes, and then still in the mold at 160° C. and the same pressure for an additional hour. A pale yellow translucent laminate approximately 10×10×⅛inches was thus obtained. A sample of the laminate was exposed at a temperature of 371° C. (700° F.) in an inert atmosphere. Over a period of an hour and 15 minutes, the total weight loss observed was 6.4 percent. At the end of this period no further weight loss was observed.

EXAMPLE 9

This example illustrates preparation of polymers in the scope of this invention employing a variety of monoisocyanates, with variation also in the catalyst and solvent employed in the polymerization.

A series of resins was prepared by combining 12.5 g. of 4,4'-diphenylmethane diisocyanate with monoisocyanates in the diisocyanate: monoisocyanate ratio shown below. In all cases, the amount of catalyst used was 3.0 ml. of 0.072 M solution, 0.01 ml. of cocatalyst was employed, and the solvent provided approximately 19 percent of the total weight of the formulation. The formulations were cast in molds to provide ⅛-inch-thick specimens, stored at room temperature (73° F.) for 2 hours, and then heated 17 hours at 100° C. For postcuring, the resulting discs were held in a heated press while the temperature was raised 30° F./10 min. to a maximum of 600° F. In all cases, high molecular weight polyisocyanurate resins were formed which had softening points above 500° F., and ranging up to above 700° F.

| Isocyanate | Molar ratio [1] | Solvent [2] | Catalyst | Cocatalyst |
| --- | --- | --- | --- | --- |
| Phenyl | 1:0.35 | DMSO | Sodium cyanide | |
| Do | 1:0.35 | DMSO | Cobalt naphthenate | |
| p-Tolyl | 1:0.35 | THF | Diazabicyclooctane | |
| Do | 1:0.35 | THF | ____do____ | Styrene oxide. |
| Do | 1:0.35 | DMSO | ____do____ | Propanal. |
| p-Methoxyphenyl | 1:0.35 | DMSO | Cobalt naphthenate | |
| Do | 1:0.35 | DMSO | Tetramethylethylenediamine | |
| p-Chlorophenyl | 1:0.75 | DMSO | Diazabicyclooctane | |
| Do | 1:0.75 | DMSO | ____do____ | Styrene oxide. |
| Do | 1:0.75 | THF | ____do____ | Propanal. |
| Do | 1:0.35 | DMSO | Sodium cyanide | |
| Do | 1:0.35 | DMSO | 1,4-dimethylpiperazine | |
| m-Chlorophenyl | 1:0.35 | THF | Diazabicyclooctane | |
| Do | 1:0.35 | DMSO | ____do____ | Styrene oxide. |
| Do | 1:0.35 | DMSO | ____do____ | Propanal. |

[1] Diisocyanate:monoisocyanate.
[2] DMSO=Dimethylsulfoxide; THF=Tetrahydrofuran.

EXAMPLE 10

This example illustrates preparation of polymers in the scope of this invention employing a variety of diisocyanates.

In this set of experiments, the molar ratio of diisocyanate to monoisocyanate is maintained at 1:0.35, and the formulation in each case employs 0.0099 mole of styrene oxide, 0.0086 mole of 1,4-diazobicyclooctane and 60 ml. of dry dimethylsulfoxide per mole of diisocyanate. The formulations were either heated at 100° C. for 1 hour, or heated 2 minutes at 180° C. prior to addition of the bicyclo catalyst (to ensure homogeneity) and then exposed to 100° C. for an hour. In all cases, this gave a clear, transparent solution of high molecular weight polyisocyanurate. This was then exposed to 600° F. for 1 hour under a vacuum of below 1 mm. Hg. to effect removal of solvent and postcure. Each of the resulting solid polymers had a softening point of above 750° F., and was tough and resistant to thermal degradation.

| Diisocyanate | Monoisocyanate |
| --- | --- |
| 4,4'-diphenylmethane diisocyanate | phenyl |
| 4,4'-diphenylmethane diisocyanate | m-chlorophenyl |
| 2,2-(4,4'-diisocyanatodiphenyl)propane | phenyl |
| 4,4'-diisocyanatobenzophenone | phenyl |

Preparation of the benzophenone diisocyanate is conducted by bubbling dry HCl into a solution of 0.129 mole of 4,4'-diaminobenzophenone in 450 ml. of diglyme at about 100° C. to form the dihydrochloride, and then heating the slurry at 162° C. for 2.5 hours while phosgene is added. The resulting clear solution is cooled and filtered, the filtrate concentrated by way of vacuum distillation, and the resulting precipitate purified by sublimation, to isolate 8.0 grams of product giving a single peak on VPC. 4,4'-diisocyanatobenzophenone is a solid, m 175°–76° C.

EXAMPLE 11

This example illustrates preparation of a strong, thermally stable laminate.

A mixture of 105.0 grams of 4,4'-diphenylmethane diisocyanate and 18.2 ml. m-chlorophenylisocyanate (1:0.35 molar ratio) with 0.42 ml. styrene oxide, and 25.2 ml. of an 0.144 M solution of 1,4-diazabicyclooctane in dry dimethylsulfoxide is exposed for 2 minutes to 200° F. (raising the mix temperature to about 125° F.), until it has become transparent. Now the mix is poured between and over 14 plies of 8×9 inch, style 181, A1100γ-aminopropyl silane finish, predried glass cloth pieces, and the assembly is placed in a press where it is held at 125° F. under about 20 p.s.i. pressure. After 15 minutes the exudate is observed to be viscous enough to form threads. Now the pressure is raised to 785 p.s.i., compressing the laminate to about one-eighth inch thickness, and heating at 125° F. is maintained for an hour. At this point the gel structure has formed. Now curing is effected by raising the temperature gradually, over a half hour to 200° and holding at that temperature for an hour. Initial cure is now complete. To effect postcure, the laminate is heated under the 785 p.s.i. pressure from 200° to 600° F. in 30° F./10-minute increments and, held at 600° F. for 1 hour. Properties of the laminate, determined by Federal Specification method LP–406b on triplicate samples, are as follows

|  | At Room temp | After ½ hr. at 500° F. in air, at 500° F. | After 192 hr. at 550° F. in N$_2$, at 550° F. |
| --- | --- | --- | --- |
| Flexural strength p.s.i. | 72,000 | 55,600 | 47,500 |
| Flexural modulus, p.s.i. | 3.29×10⁶ | 3.16×10⁶ | 2.95×10⁶ |

Using essentially the above-stated formulation, it has been established in preparation of a large number of laminates that the above-stated properties are characteristic and consistently reproducible.

EXAMPLE 12

Using molar ratios, formulations and procedures as described in the preceding example, laminates were prepared comprising the polyisocyanurates obtained from 4,4'-diphenylmethane diisocyanate with p-chlorophenyl isocyanate and with p-methoxyphenyl isocyanate. Again tough, strong, heat-resistant laminates are produced, as shown by the LP–406b test values obtained on samples run in quadruplicate, measured at the stated temperatures after one half hour at the stated temperatures p-Chlorophenyl Copolymer Laminate

|  | Flexural strength, p.s.i. | | | Flexural modulus |
| --- | --- | --- | --- | --- |
|  | high | low | av |  |
| at 73° F. | 65,000 | 57,000 | 59,000 | 3.0×10⁶ |
| at 500° F. | 43,000 | 29,000 | 34,000 | 2.3×10⁶ |
| at 600° F. | (one sample) |  | 36,000 | 2.5×10⁶ | p-Methoxyphenyl Copolymer Laminate

|  | Flexural strength, p.s.i. | | | Flexural modulus |
| --- | --- | --- | --- | --- |
|  | high | low | av |  |
| at 73° F. | 62,000 | 53,000 | 58,000 | 3.1×10⁶ |
| at 500° F. | 47,000 | 43,000 | 45,000 | 2.5×10⁶ |

While the invention has been described with reference to various particular preferred embodiments thereof, it is to be appreciated that modification and variations can be made without departing from the scope of the invention, which is limited only as defined in the appended claims.

What is claimed is:

1. An article of manufacture comprising a plurality of sheets of glass fabric bonded together by means of a polymeric material containing at least about 25 difunctional organic substituted isocyanurate rings and trifunctional organic substituted isocyanurate rings in an amount of up to about 10 times the amount of difunctional organic substituted isocyanurate rings, said polymeric material having been produced by reacting a diisocyanate chosen from the group consisting of 4,4'-diphenylmethane diisocyanate, 4,4'-diisocyanatobenzophenone and mixtures thereof and a monoisocyanate chosen from the group consisting of phenyl isocyanate, p-tolyl isocyanate, p-methoxyl phenyl isocyanate, p-chlorophenylisocyanate, m-chlorophenyl isocyanates and mixtures thereof.

2. The article of claim 1—wherein said diisocyanate is 4,4'-diphenyl methane diisocyanate and said monoisocyanate is m-chlorophenyl isocyanate.

* * * * *